(12) United States Patent
Plessius

(10) Patent No.: US 9,216,864 B1
(45) Date of Patent: Dec. 22, 2015

(54) GENTLE FLUME

(71) Applicant: Compac Technologies Limited, Auckland (NZ)

(72) Inventor: Eric Adrianus Plessius, Auckland (NZ)

(73) Assignee: Compac Technologies Limited, Auckland (NZ)

( * ) Notice: Subject to any disclaimer, the term of this patent is extended or adjusted under 35 U.S.C. 154(b) by 0 days.

(21) Appl. No.: 14/587,975

(22) Filed: Dec. 31, 2014

Related U.S. Application Data

(63) Continuation of application No. PCT/NZ2014/000088, filed on May 16, 2014.

(51) Int. Cl.
*B65G 51/18* (2006.01)
*B65G 51/01* (2006.01)

(52) U.S. Cl.
CPC ...................... *B65G 51/01* (2013.01)

(58) Field of Classification Search
USPC ............... 193/7, 37, 28, 34; 406/192, 195; 198/534; 134/182, 183; 210/154
See application file for complete search history.

(56) References Cited

U.S. PATENT DOCUMENTS

| | | | | |
|---|---|---|---|---|
| 1,309,119 A * | 7/1919 | Dillon | | 193/7 |
| 3,187,872 A * | 6/1965 | Hill et al. | | 193/7 |
| 3,258,142 A * | 6/1966 | Girardi | | 414/508 |
| 3,590,993 A * | 7/1971 | Baker | | B07B 13/00 |
| | | | | 209/543 |
| 3,640,366 A * | 2/1972 | Ross et al. | | 193/7 |
| 3,713,527 A * | 1/1973 | Ginther | | 198/389 |
| 3,752,314 A * | 8/1973 | Brown | | B65G 53/30 |
| | | | | 209/173 |
| 3,974,839 A * | 8/1976 | Wochnowski et al. | | 131/304 |
| 4,040,256 A * | 8/1977 | Bosche et al. | | 405/119 |
| 4,040,529 A * | 8/1977 | Wurdeman et al. | | 414/301 |
| 4,297,219 A * | 10/1981 | Kirk | | B01D 29/0027 |
| | | | | 210/155 |
| 5,019,259 A * | 5/1991 | Hambley | | B01D 24/24 |
| | | | | 210/274 |
| 5,662,812 A * | 9/1997 | McEwen | | B23Q 11/0057 |
| | | | | 137/602 |
| 6,082,382 A * | 7/2000 | Buksa | | A23N 12/02 |
| | | | | 134/104.3 |
| 6,409,914 B1 * | 6/2002 | Keppeler et al. | | 210/151 |
| 6,478,133 B1 * | 11/2002 | Woignier et al. | | 193/27 |
| 6,616,385 B1 * | 9/2003 | Raginskii et al. | | 406/85 |
| 6,655,878 B1 * | 12/2003 | de Vos et al. | | 406/77 |
| 6,840,715 B2 * | 1/2005 | Crovara Pescia | | 406/92 |
| 7,311,846 B2 * | 12/2007 | Comer | | B03C 1/02 |
| | | | | 137/590 |
| 7,807,050 B2 * | 10/2010 | Baumann et al. | | 210/107 |
| 8,109,698 B2 * | 2/2012 | De Greef | | 406/106 |
| 8,142,666 B1 * | 3/2012 | Happel | | 210/747.2 |
| 8,313,269 B2 * | 11/2012 | Fisher et al. | | 406/173 |
| 8,821,078 B2 * | 9/2014 | Hockett et al. | | 406/181 |
| 8,839,712 B2 * | 9/2014 | Stousland et al. | | 99/361 |
| 2001/0040124 A1 * | 11/2001 | Bennett | | B01D 29/118 |
| | | | | 210/155 |
| 2003/0198515 A1 * | 10/2003 | McFarland | | E04H 4/0006 |
| | | | | 405/79 |
| 2005/0022803 A1 * | 2/2005 | Dannenhauer et al. | ... | 126/273 R |
| 2005/0092194 A1 | 5/2005 | Bajema et al. | | |
| 2009/0032072 A1 | 2/2009 | Bajema et al. | | |
| 2009/0133985 A1 * | 5/2009 | Preston | | B65F 1/0093 |
| | | | | 193/34 |
| 2010/0108092 A1 * | 5/2010 | Zaharis | | B08B 3/12 |
| | | | | 134/1 |
| 2015/0064084 A1 * | 3/2015 | Kurushima | | 423/210 |
| 2015/0191310 A1 * | 7/2015 | Benjamin | | B65G 11/166 |
| | | | | 193/32 |

* cited by examiner

*Primary Examiner* — Joseph Dillon, Jr.
(74) *Attorney, Agent, or Firm* — Lowe Graham Jones PLLC

(57) ABSTRACT

An elongate flume is provided for receiving items of produce. The flume comprises a first side and an opposite second side. A plurality of baffles are provided, each baffle having a first end at or adjacent the first side of the flume and a second end which is spaced apart from the first side of the flume and spaced apart from the second side of the flume.

15 Claims, 4 Drawing Sheets

GENTLE FLUME

PRIORITY CLAIM

This application is a continuation of PCT Application Serial No. PCT/NZ2014/000088 filed May 16, 2014.

FIELD OF THE INVENTION

It is an object of the present invention to provide an improved flume for receiving items of produce, or at least one which will provide a useful choice.

BACKGROUND OF THE INVENTION

In the sorting, grading and/or packaging of some items of produce, the produce is conveyed through a machine (or through a part or parts of the machine) in a stream of water. Conveying the produce in this way reduces the likelihood of the produce being damaged, and so is particularly suitable for delicate items such as cherries.

The water in which the produce is conveyed is often chilled. If the machine requires a large flow rate of water then the energy cost of pumping and chilling the water can be significant.

Another consideration with any such machine is the need to keep individual items of produce separate if possible. If groups of the individual items become entwined (particularly items such as cherries which are picked with their stalks attached) then this can lead to blockages in the machine.

The reference to any existing technology in the specification is not, and should not be taken as, an acknowledgement or any form of suggestion that that technology forms part of the common general knowledge in any country.

SUMMARY OF THE INVENTION

According to one aspect of the present invention there is provided an elongate flume for receiving items of produce, the flume comprising a first side and an opposite second side, the flume provided with a plurality of baffles, each baffle having a first end at or adjacent the first side of the flume and a second end which is spaced apart from the first side of the flume and spaced apart from the second side of the flume.

Preferably, in use, water flows from a first end of the flume to a second end of the flume, and wherein the second end of each baffle is offset towards the second end of the flume relative to the first end of the baffle.

Preferably the baffles comprise substantially flat plates.

Preferably the baffles are substantially parallel to each other.

Preferably the baffles are substantially vertical.

Preferably the flume is provided with at least two baffles.

Preferably a distance between the first side of the flume and the second end of one of said baffles is greater than the distance between the second end of said baffle and the second side of the flume.

Preferably the flume comprises a floor which has a sloping portion which slopes downwardly from the first side towards the second side.

Preferably the floor has a substantially flat portion between the sloping portion and the second side, wherein the flat portion does not slope between the first and second sides.

Preferably the sloping portion of the floor extends beyond the baffles towards the second side of the flume.

Preferably the first end of the flume comprises an inlet channel and the second end of the flume comprises an outlet channel.

Preferably a width of the inlet and outlets channels is substantially equal to the space between the second end of one of said baffles and the second side of the flume.

Preferably the inlet channel slopes downwardly.

Preferably the outlet channel comprises a weir portion.

Preferably the weir portion comprises a floor portion which slopes upward.

Preferably a height of the baffles is equal to or greater than a height of the weir portion.

Preferably the first and second sides of the flume are substantially parallel.

According to a second aspect of the present invention there is provided a flume for receiving items of produce substantially as herein described with reference to the accompanying drawings.

According to a further aspect of the present invention there is provided an elongate flume having a first end and a second end, a first side and an opposite second side, the flume configured such that when water flows, in use, through the flume from the first end to the second end, an area of substantially stationary water is created adjacent the first side of the flume.

Preferably the flume comprises a floor which slopes downward from the first side towards the second side.

Preferably the area of substantially stationary water is created by a plurality of baffles, each baffle having a first end at or adjacent the first side of the flume and a second end which is spaced apart from the second side of the flume.

Preferably the second end of each baffle is offset in the downstream direction from the first end of the baffle.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent from the following description given by way of example of possible embodiments of the invention.

DETAILED DESCRIPTION

Figure 1:
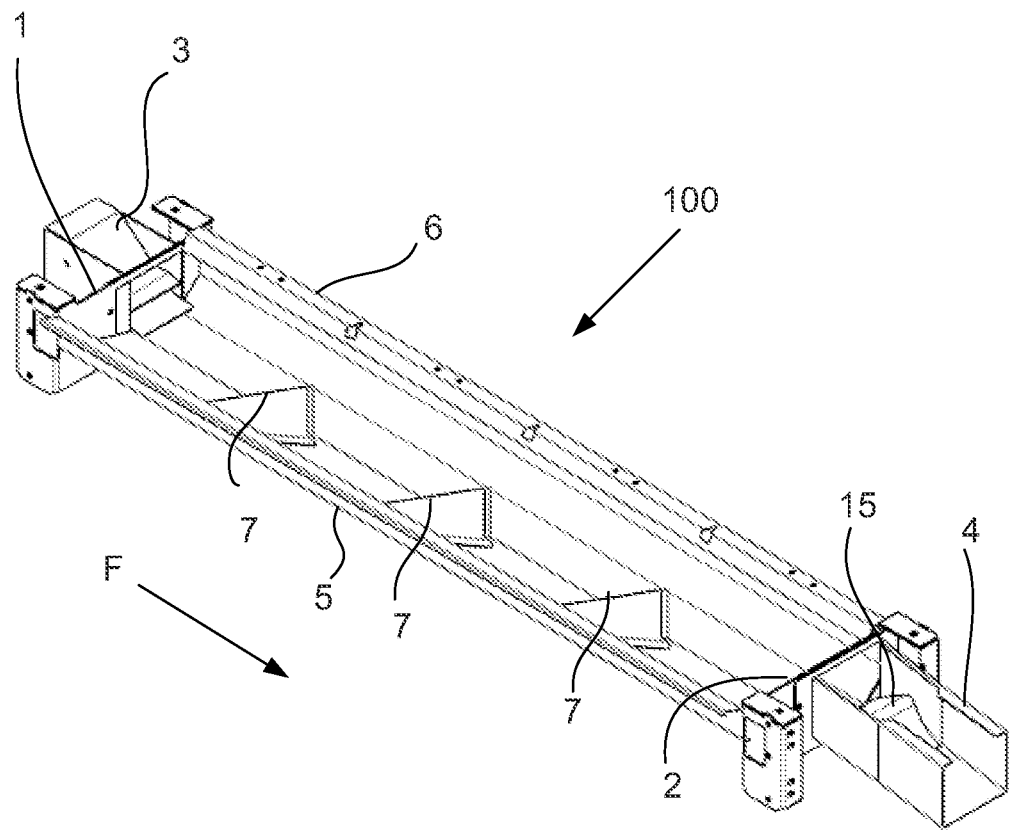
FIG. 1 is an isometric view of a flume of the present invention.

Referring to the figures, a flume according to embodiment of the present invention is generally referenced by arrow 100.

The flume 100 has a first end 1 and second end 2. In use, water flows from the first end 1 towards the second end 2, as indicated by arrow F. In the embodiment shown the flume has an inlet channel 3 at the first end 1 and an outlet channel 4 at the second end 2, although other inlet and outlet configurations are possible. The inlet and outlet channels 3, 4 are described further below.

Figure 3:
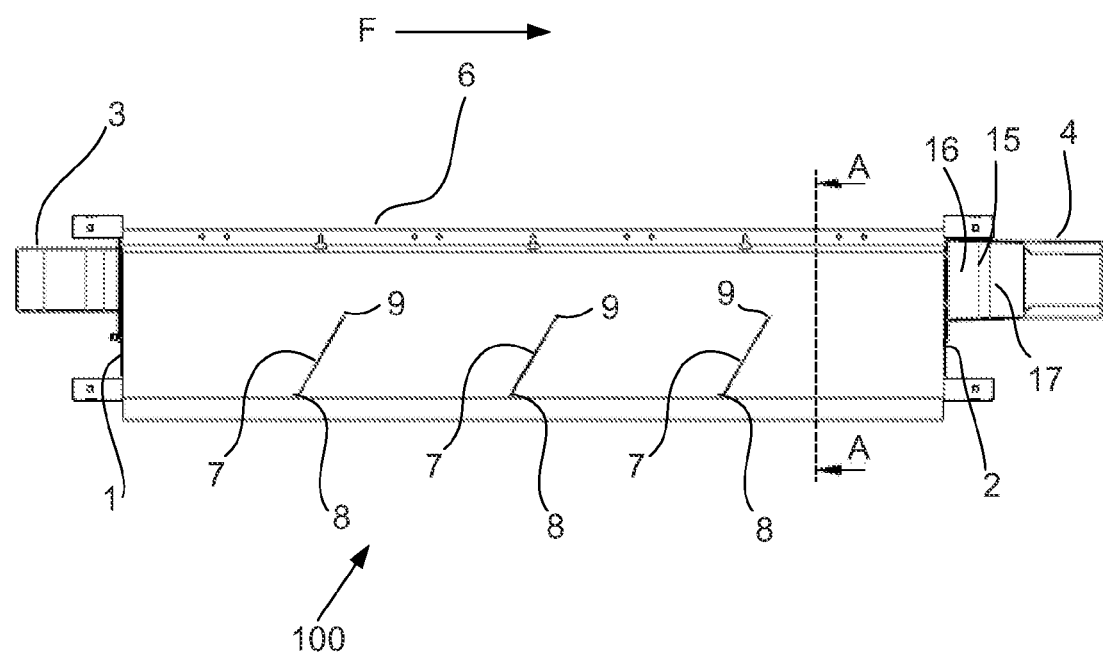
FIG. 3 is a plan view of the flume of FIG. 1.
Figure 4:
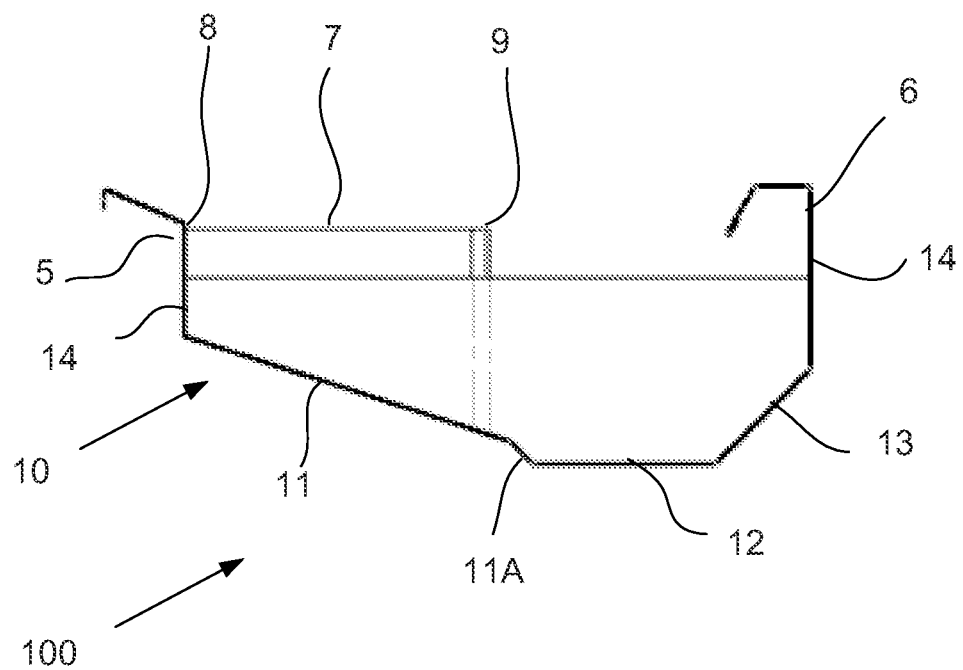
FIG. 4 is a cross-section of the flume of FIG. 1 through plane A-A.

Referring to FIGS. 3 and 4 in particular, the flume 100 has a first side 5 and an opposite second side 6. In a preferred embodiment the sides 5, 6 are substantially parallel.

Referring next to FIG. 3 in particular, at least two, and more preferably three or more baffles 7 are provided which extend from the first side 5 toward the second side 6. The baffles 7 have a first end 8 at or adjacent the first side 5 and a second end 9 which is spaced apart from the second side 6 so as to allow the water to flow between the second end 9 of the baffle 7 and the second side 6 of the flume.

The presence of the baffles 7 creates an area in the flume 100 between the baffles 7 in which the water does not flow. The water is preferably substantially stationary in this area, although there may be some eddy currents present.

The baffles 7 are preferably angled such that the second end 9 of each baffle 7 is further downstream (that is, further towards the second end 2 of the flume) than the first end 8 of the baffle.

In preferred embodiments the baffles 7 form an angle of between 90° and 45° to the second side 6 of the flume 100.

The flume 100 has a floor 10 which comprises a sloping portion 11 which slopes downward from the first side 5 towards the second side 6. The floor 10 further comprises a substantially flat portion 12 adjacent the sloping portion 11 which does not have a slope in the direction between the first and second sides 5, 6. An upwardly sloping portion 13 may be provided between the flat portion 12 and the second side 6. In the embodiment shown the sloping portion 11 has a portion of increased slope 11a adjacent the intersection with the flat portion 12. The flume may also comprise substantially vertical side walls 14.

In preferred embodiments the sloping portion 11, 11A of the floor extends beyond the second end 9 of each baffle 7, as best seen in FIG. 4.

Figure 2:
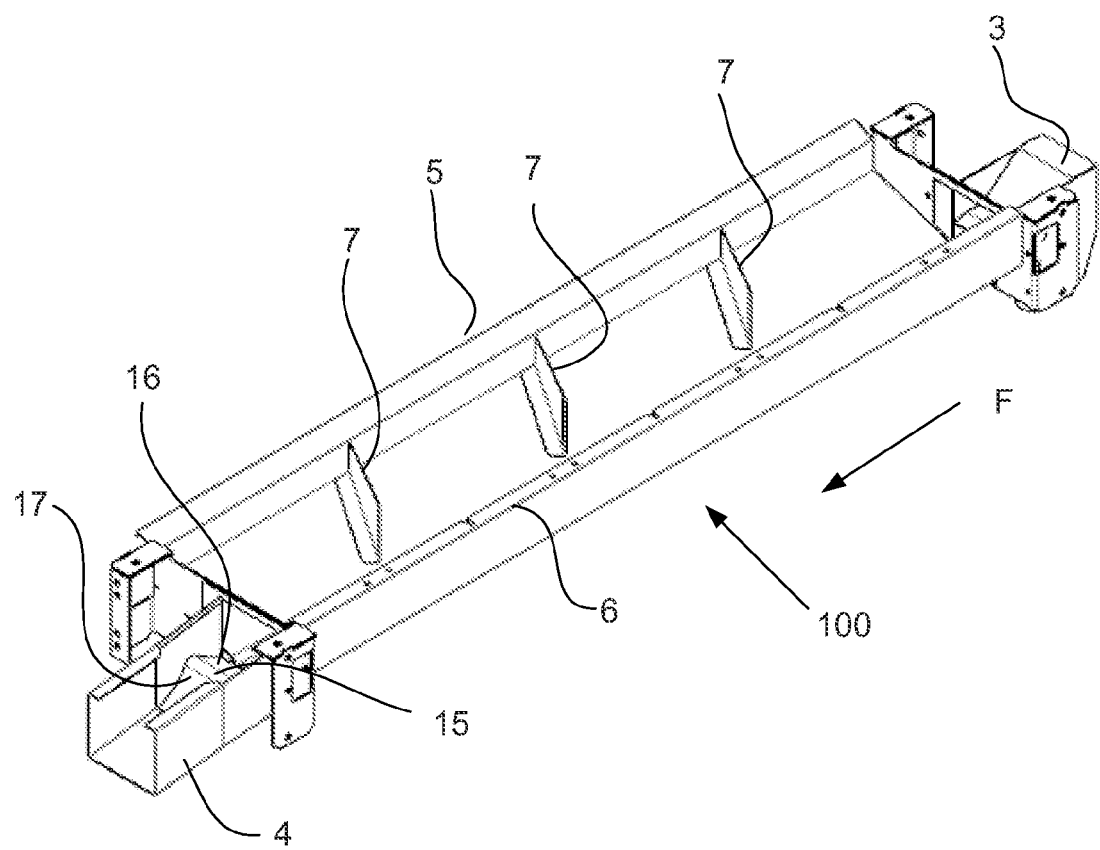
FIG. 2 is an isometric view of the flume of FIG. 1 from the opposite side.

Referring next to FIGS. 1-3, the flume 100 may have an inlet channel 3 which is downwardly sloped (in the direction of the water flow) and the outlet channel 4 may comprise a weir portion 15. The weir portion 15 has a portion 16 which slopes upwardly (in the direction of the water flow) followed by a downwardly sloping portion 17. The weir portion is preferably shaped such that, in use, the depth of the water in the flume above the flat portion 12 of the floor is at least equal to the average diameter of the produce. When used for cherries, the water depth may be around 100 mm.

In embodiments with sufficient back pressure downstream of the flume 100, or in the flume outlet 4, the weir portion 15 may be omitted. The weir portion 15, if provided, need not be watertight, but merely provides the back pressure required to maintain the required water level in the flume when the flume is in use.

The width of the inlet and outlet channels 3, 4 is preferably substantially equal to the width of the clear space between the second end 9 of the baffles 7 and the second side 6 of the flume 100, and the channels 3, 4 are preferably substantially in line with this clear space so that water can flow from the inlet channel 3 to the outlet channel 4 substantially without interruption from the baffles 7, although some turbulence is preferably created around the second end 9 of the baffles. This turbulence assists in moving the produce through the flume.

In use, items of produce, for example cherries, are dropped into the flume 100, for example from a conveyor (not shown).

The items land in the water in the space between the baffles 7, that is, in the area of the flume in which the water is not flowing. In preferred embodiments the items enter the water towards the second end 9 of the baffles 7, that is, towards the centerline of the flume 100 and away from the first side 5 of the flume 100.

In a preferred embodiment the items enter the water with a horizontal momentum component which tends to carry the items towards the flowing water above the flat portion 12 of the floor. The produce moves down the sloping portion 11 of the floor 10 towards the second end 9 of the baffles 7 and is then carried away by the water flow towards the outlet channel 4.

One advantage of providing the baffles 7 is that groups of produce which have become entangled will tend to become separated as each individual item in the group enters the stream of flowing water and is carried away.

A further advantage is that the flume can be relatively wide, and the flowing portion of the water relatively deep, while still requiring a relatively low flow rate of water to operate properly.

A still further advantage is that separating the area of the flume into which the produce is received from the area in which the produce moves through the flume reduces the chances of contact between the produce items, and in particular, reduces the chances that an item of produce which is dropped into the flume will land on top of another item which is already in the flume.

In a preferred embodiment the flume 100 comprises part of an otherwise conventional produce sorting machine (not shown), for example a cherry sorting machine. The flume may receive items of produce which have been scanned and/or graded and/or sized and which are to be transported to a packaging station. The produce sorting machine preferably comprises separate flumes 100 for each different grade and/or size of produce.

Unless the context clearly requires otherwise, throughout the description and the claims, the words "comprise," "comprising," and the like, are to be construed in an inclusive sense as opposed to an exclusive or exhaustive sense, that is to say, in the sense of "including, but not limited to."

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the scope of the appended claims.

The embodiments of the invention in which an exclusive property or privilege is claimed are defined as follows:

1. An elongate flume for receiving items of produce, the flume having a first side and an opposite second side and a floor with a sloping portion which slopes downwardly from the first side towards the second side, the floor comprising a further portion between the sloping portion and the second side that does not slope downwardly between the first and second sides, the flume comprising a plurality of baffles, each baffle having a proximal end at or adjacent the first side of the flume and a distal end extended generally towards but spaced apart from the second side of the flume.

2. The flume of claim 1, wherein
the flume has a first end and a second end and
the distal end of each baffle is offset towards the second end of the flume relative to the proximal end of the baffle.

3. The flume of claim 1, wherein the baffles comprise substantially flat plates.

4. The flume of claim 1, wherein the baffles are substantially parallel to each other.

5. The flume of claim 1, wherein the baffles are substantially vertical.

6. The flume of claim 1, wherein the flume is provided with at least three baffles.

7. The flume of claim 1, wherein a distance between the first side of the flume and the distal end of one of said baffles is greater than the distance between the distal end of the baffle and the second side of the flume.

8. The flume of claim 1, wherein the sloping portion of the floor extends beyond the baffles towards the second side of the flume.

9. The flume of claim 1, wherein the first end of the flume comprises an inlet channel and the second end of the flume comprises an outlet channel.

10. The flume of claim 9, wherein a width of the inlet and outlets channels is substantially equal to the space between the distal end of one of said baffles and the second side of the flume.

11. The flume of claim 9, wherein the inlet channel slopes downwardly.

12. The flume of claim 9, wherein the outlet channel comprises a weir portion.

13. The flume of claim 12, wherein the weir portion comprises a floor portion which slopes upward.

14. The flume of claim 12, wherein a height of the baffles is equal to or greater than a height of the weir portion.

15. The flume of claim 1, wherein the first and second sides of the flume are substantially parallel.

* * * * *